United States Patent [19]

Spelthann

[11] Patent Number: 5,610,234

[45] Date of Patent: *Mar. 11, 1997

[54] FLEXIBLE POLAR THERMOPLASTIC POLYOLEFIN COMPOSITIONS

[75] Inventor: Heinz H. Spelthann, Trier, Germany

[73] Assignee: E. I. Du Pont de Nemours and Company, Wilmington, Del.

[ * ] Notice: The term of this patent shall not extend beyond the expiration date of Pat. No. 5,395,881.

[21] Appl. No.: 381,939

[22] PCT Filed: Aug. 10, 1993

[86] PCT No.: PCT/US93/07369

§ 371 Date: Mar. 21, 1995

§ 102(e) Date: Mar. 21, 1995

[87] PCT Pub. No.: WO94/04610

PCT Pub. Date: Mar. 3, 1994

[30] Foreign Application Priority Data

Aug. 14, 1992 [GB] United Kingdom .................. 9217381

[51] Int. Cl.⁶ .................................................. C08L 51/06
[52] U.S. Cl. ............................ 525/64; 525/185; 525/539; 524/504
[58] Field of Search .............. 525/64, 185, 539; 524/504

[56] References Cited

U.S. PATENT DOCUMENTS

| | | | |
|---|---|---|---|
| 4,868,242 | 9/1989 | George | 525/64 |
| 5,089,556 | 2/1992 | Tabor | 525/64 |
| 5,395,881 | 3/1995 | Spelthann | 525/63 |

FOREIGN PATENT DOCUMENTS

3633056A1 4/1988 Germany.
PCT/US87/02921 11/1987 WIPO.

Primary Examiner—Vasu S. Jagannathan

[57] ABSTRACT

Polar thermoplastic polyolefin blends are provided which are flexible and are particularly useful in replacing polyvinyl-chloride sheeting used as liners, folders, etc. The blends comprise, in general, a non-polar thermoplastic polyolefin, a polar ethylene copolymer, and an acid grafted olefin polymer as a compatibilizing agent, all of which are chlorine-free.

12 Claims, No Drawings

FLEXIBLE POLAR THERMOPLASTIC POLYOLEFIN COMPOSITIONS

BACKGROUND OF THE INVENTION

1. Field of Invention

This invention relates to polyolefin compositions and more particularly to such compositions which are flexible and polar, and to shaped articles made from them.

2. Background Discussion

Polyvinyl chloride (PVC) sheets have been on the market for many years and have been the standard liner material in the housing industry. PVC sheets are characterized by being flexible over a variable temperature range, heat-sealable, and oil-resistant. However, with the trend toward a chlorine-free environment, there is a need for a PVC sheeting alternative. Ethylene/propylene/diene monomer (EPDM) rubbers are alternatives, but these are difficult to seal. Thus, there is a need for PVC-free sheets which are thermoplastic and heat-sealable, halogen-free and flexible.

SUMMARY OF THE INVENTION

According to the present invention there is provided a flexible, non-halogen-containing polymer composition which comprises a blend of:

(a) 35–96% by weight of a non-polar thermoplastic polyolefin;

(b) 3–50% by weight of a polar ethylene copolymer which comprises:
  (i) 30–80% by weight of ethylene;
  (ii) 5–60% by weight of at least one copolymerizable, ethylenically unsaturated organic compound; and
  (iii) 3–30% by weight of carbon monoxide; and (c) 1–30% by weight of a compatibilizing agent which is a carboxylic acid or derivative thereof grafted olefin polymer.

DETAILED DESCRIPTION OF THE INVENTION

The invention relates to flexible, non-halogen containing thermoplastic polymer blends which are useful in sheet form as liners for roofing, etc. or for making folders, and in film form as packaging films. These blends generally are formed by combining a non-polar thermoplastic polyolefin and a soft, polar thermoplastic ethylene copolymer. A compatibilizing agent is required in order to affect the blend. Such polymer blends can be formed into sheets, films, and other shaped articles which have many properties comparable to polyvinyl chloride (PVC), but with better elongation and with no chlorine.

The term "non-polar thermoplastic polyolefin" means any polyolefin polymer which is thermoplastic but which excludes polar ethylene copolymers as defined herein. In general, these polyolefins will have a melt flow index (MFI) in the range of 0.01–100 g/10 min., preferably less than 5 g/10 min. as determined by ASTM D-1238 (measured at 2,16 kg and 190° C. or 230° C. depending on the polyolefin used). Useful polyolefins are high density polyethylene (HDPE) and polypropylene. Other polyolefin homopolymers and copolymers of ethylene can be utilized in the practice of this invention. Such other polyolefins include low density polyethylene (LDPE), very low density polyethylene (VLPE), linear low density polyethylene (LLDPE) and polybutylene (PB). However, these other polyolefins can be blended with other polyolefins such as polypropylene ("PP") or high density polyethylene ("HDPE"). As used herein the term "polypropylene" includes homopolymers of propylene as well as copolymers of polypropylene which can contain about 1 to about 20 weight percent ethylene or an alpha olefin comonomer of 4 to 16 carbon atoms. The polypropylene can be highly crystalline isotactic or syndiotactic polypropylene. The copolymer can be either a random or block copolymer. The density of the PP or copolymer can be from about 0.88 to about 0.92 g/cc; generally, from about 0.89 to about 0.91 g/cc.

High density polyethylene useful as a polyolefin resin of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

Low density polyethylene (LDPE) as used herein means both low and medium density polyethylene having densities of about 0.910 to about 0.940 g/cc. The terms include linear polyethylene as well as copolymers of ethylene which are thermoplastic resins, but non-polar.

Very low density polyethylene (VLDPE) is used herein to mean polyethylene having a density below about 0.910 g/cc and includes linear polyethylene as well as copolymers of ethylene which are thermoplastic resins, but non-polar.

Linear low density polyethylene (LLDPE) is a class of low density polyethylene characterized by little, if any, long chain branching, in contrast to conventional LDPE. The processes for producing LLDPE are well known in the art and commercial grades of this polyolefin are available. The term LLDPE means copolymers of ethylene and other alpha-olefins such as 1-butene, 1-hexene, and 1-octene. Useful LLDPEs have both high and low molecular weights. Such copolymers with 1-butene tend to be more crystalline and thus are more useful as roofing liners; whereas such copolymers with 1-octene are clearer and perhaps more useful in packaging applications. The LLDPEs are preferred.

Polybutylene includes both poly (1-butene) homopolymer and a copolymer with, for example, ethylene, propylene, pentene-1, etc. Commercially useful products are of high molecular weight and isotacticity. A variety of commercial grades of both homopolymer and ethylene-butene-1 copolymers are available with melt flow indices that range from about 0.3 to about 20 g/10 min.

The non-polar thermoplastic polyolefins are present in blends of the invention at a concentration in the range of 35–96% by weight, with the concentration used depending upon the final use of the blend. For example, blends useful in a blown film process to make films for packaging applications will, in general, contain more polyolefin (e.g., 50–80%) than blends useful to make sheets for roofing liners (e.g., 40–50%).

Polar ethylene copolymers useful in the blends of this invention and their preparation are described in U.S. Pat. No. 3,780,140 to Hammer, the description of which is incorporated by reference.

These polar ethylene copolymers consist essentially of ethylene, carbon monoxide and one or more termonomers which are chlorine-free and are copolymerizable ethylenically unsaturated organic compounds. Such termonomers are selected from the class consisting of non-chlorine containing unsaturated mono- and dicarboxylic acids of 3–20 carbon atoms, esters of such unsaturated mono- or dicarboxylic acids, vinyl esters of saturated carboxylic acids wherein the acid group has 1–18 carbon atoms, vinyl alkyl ethers wherein the alkyl group has 1–18 carbon atoms, acrylonitrile, methacrylonitrile, copolymerizable unsaturated hydrocarbons such as alpha-olefins of 3–12 carbon atoms, ring compounds such as norbornene and vinyl aromatic compounds.

In particular, these copolymers consist essentially of, by weight, (a) 30–80% ethylene, (b) 3–30% carbon monoxide, and (c) 5–60% of one or more termonomers copolymerizable therewith to produce solid copolymers. Preferred copolymers include those consisting essentially of 56–76% ethylene, 3–15% carbon monoxide, and 10–34% of said termonomer(s). More preferred copolymers include those in which vinyl acetate or an alkyl (1–8 carbons) acrylate or alkyl methacrylate (particularly n butyl acrylate) is the termonomer. The copolymers normally have a melt flow index within the range 0.1–1000 g/10 min., preferably 1–500, measured according to ASTM D-1238. Most preferably, the melt index is less than 100 g/10 min.

The polar ethylene copolymers are present in blends of the invention at a concentration in the range of 3–50% by weight, with the particular concentration used being dependent upon the final use of the blend. For roofing liners and other industrial sheeting uses, 20–50% of the copolymer will be used; whereas for packaging films made by a blown film process, 10–40% of copolymer is sufficient to increase polarity.

The blends of the invention also contain 1–30% by weight of a compatibilizing agent, typically 5–20% by weight. For roofing liners and other industrial sheeting, the blends preferably contain 10–15% by weight compatibilizer; whereas for packaging films, the blends preferably contain 1–15% by weight compatibilizer. The compatibilizing agent is an olefin polymer which has been functionalized by grafting a carboxylic acid or derivative thereof (such as an anhydride) to the polymer by known processes. Any of the above-described non-polar thermoplastic polyolefins can be subjected to the grafting process. A polyolefin is graft modified with 0.05 to 3.0 weight percent, preferably 0.5 to 1 weight percent, of a carboxylic acid or a derivative thereof. The grafting of the polyolefin can be carried out in the melt state, in solution or in suspension as described in the state-of-the-art literature. The melt viscosity of the modified polyolefin is not restricted, however, most effective compatibilization with modified polypropylene is found if the melt index, measured according to ASTM D-1238 (at 2.16 kg and 190° C.) is between 50 to 150 g/10 min. and with modified polyethylene if the melt index (measured at 2.16 kg and 190° C.) is less than 6 g/10 min., respectively. Maleic anhydride is the preferred functionalizing agent. Such modified polyolefins can be prepared as described, for example, in published European Patent Application Nos. 370,735 and 370,736.

The blends of the invention can be prepared by mixing the polymeric ingredients and optional additives by use of conventional masticating equipment, for example, a rubber mill, Brabender Mixer, Banbury Mixer, Buss-ko kneader, Farrel continuous mixer, or twin screw continuous mixer. Mixing times should be sufficient to obtain homogeneous blends. Satisfactory mixing times depend upon the types of polymers and upon the type and amount of compatibilizer. Typically, mixing times of about 5 minutes are satisfactory. If the polymer blend is obviously non-homogeneous, additional mixing is required.

In addition to its polymer components, the composition of this invention can include reinforcing and non-reinforcing fillers, antioxidants, stabilizers, lubricants (e.g., oleamide), antiblocking agents, antistatic agents, waxes, coupling agents for fillers, pigments, fire retardants, titanium dioxide, talc and other processing aids known in the polymer compounding art. These pigments and other additives comprise 0 to about 50 weight percent of the total composition preferably 5 to 30 weight percent of a filler.

The invention can be further understood by the following examples in which parts and percentages are by weight and temperatures are in degrees Celsius.

DESCRIPTION OF THE PREFERRED EMBODIMENTS

EXAMPLE 1

A polymeric blend was prepared by meltcompounding 100 phr of a linear low density polyethylene copolymer (LLDPE) containing 10%=butene and having a MFI (190°/2.16 kg)=1.0, 100 phr of an ethylene terpolymer (60% ethylene, 30% n-butylacrylate, and 10% carbon monoxide (EnBACO) having a MFI (190°/2.16 kg)=12 and 10 phr of the above linear low density polyethylene copolymer grafted with 0.085 % maleic anhydride (LLDPE-MA). Melt compounding was carried out in a Brabender internal mixer with batches from 50–55 grams at 180° at a speed of 60 rpm for ca. 5 minutes. The melt then was removed and formed into a testing plaque in a hydraulic press at 180° for 5 minutes. Afterwards stress-strain testing (DIN 53 504; S2) was carried out. Results are shown in Table 1.

TABLE 1

|  | Example Number 1 | Comparison |
| --- | --- | --- |
| LLDPE | 47.6% | 50% |
| EnBACO | 47.6% | 50% |
| LLDPE—MA | 4.8% | — |
| Properties |  |  |
| TS (MPa) | 6.5 | 5.0 |
| Mod 100 (MPa) | 5.0 | 0 |
| EB (%) | 484 | 70 |

Addition of a maleic anhydride grafted polyolefin to a blend of a polar, elastomeric ethylene copolymer and an unpolar, thermoplastic polyolefin has greater flexibility than the pure elastomer-thermoplastic blend as shown by the better elongation at break.

EXAMPLE 2 and 3

Polymeric blends were prepared by melt compounding the polymers of example 1 with different mineral fillers such as $Mg(OH)_2$ and $CaCO_3$. Melt compounding was carried out in a Brabender internal mixer with batches from 50–55 grams at 180° at a speed of 60 rpm for ca. 5 minutes. The melt then was removed and formed into a testing plaque in a hydraulic press at 180° for 5 minutes. Afterwards stress-strain testing (DIN 53 504,S2) was carried out. Results are shown in Table 2.

TABLE 2

|  | Example Number | |
| --- | --- | --- |
|  | 2 | 3 |
| LLDPE | 35.3% | 35.3% |
| EnBACO | 35.3% | 35.3% |

TABLE 2-continued

| | Example Number | |
|---|---|---|
| | 2 | 3 |
| LLDPE—MA | 7.1% | 7.1% |
| Mg(OH)2 | 17.8% | — |
| CaCO3 | — | 17.8% |
| Antioxidant | 0.4% | 0.4% |
| TiO2 | 4.0% | 4.0% |
| Stearic acid | 0.1% | 0.1% |
| Properties | | |
| TS (MPa) | 6.0 | 6.0 |
| Mod 100 (MPa) | 5.9 | 5.5 |
| EB (%) | 220 | 342 |
| Shore A | 94 | 93 |
| Tear (KN/m) | 178.4 | 158.8 |

Addition of fillers has reduced physical properties of polymer blends as described in Example 1, but not to the level of the unfilled comparison.

EXAMPLES 4–6

Polymeric blends were prepared by melt compounding the LLDPE and LLDPE-MA of Example 1 with 70 phr of various amorphous terpolymers. The first terpolymer was the terpolymer of Example 1. The second terpolymer was 62.5% ethylene, 28.5% vinyl acetate, and 9% carbon monoxide (EVACO 1) having a melt flow (190°/2.16 kg) of 35; and the third terpolymer was 71.5% ethylene, 20.5% vinyl acetate and 8% carbon monoxide (EVACO 2) having a melt flow index (190°/2.16 kg) of 15.

Melt compounding was carried out in a Brabender internal mixer with batches from 50–55 grams at 180° at a speed of 60 rpm for ca. 5 minutes. The melt then was removed and formed into a testing plaque in a hydraulic press at 180° for 5 minutes. Afterwards stress-strain (DIN 53 504,S2) testing was carried out. Results are shown in Table 3.

TABLE 3

| | Example No. | | |
|---|---|---|---|
| | 4 | 5 | 6 |
| LLDPE | 47% | 47% | 47.0% |
| EnBACO | 33% | — | — |
| EVACO1 | — | 33% | — |
| EVACO2 | — | — | 33% |
| LLDPE—MA | 7.0% | 7.0% | 7.0% |
| Antioxidant | 0.47% | 0.47% | 0.47% |
| TiO2 | 4.6% | 4.6% | 4.6% |
| CaCO3 | 7.0% | 7.0% | 7.0% |
| Acrylic Proc. Aid | 0.93% | 0.93% | 0.93% |

TABLE 3-continued

| | Example No. | | |
|---|---|---|---|
| | 4 | 5 | 6 |
| Properties: | | | |
| TS (MPa) | 12.2 | 14 | 11.6 |
| Mod 100 (MPa) | 6.1 | 7.3 | 6.3 |
| EB (%) | 792 | 704 | 726 |

This example shows that different polar ethylene terpolymers can be melt compounded with polyolefins to provide flexible blends.

EXAMPLES 7–15

Polymeric blends were prepared from the polymers of Example 1 using different concentrations as shown in Table 4. Melt compounding was carried out in a Brabender internal mixer with batches from 50–55 grams at 180° at a speed of 60 rpm for ca. 5 minutes. The melt then is removed and formed into a testing plaque in a hydraulic press at 180° for 5 minutes. Afterwards stress-strain testing was carried out. Results are shown in Table 4.

TABLE 4

| | Example No. | | | | | | | | |
|---|---|---|---|---|---|---|---|---|---|
| | 7 | 8 | 9 | 10 | 11 | 12 | 13 | 14 | 15 |
| LLDPE | 40 | 87 | 56 | 55.5 | 65.5 | 48 | 71.5 | 79 | 71 |
| EnBACO | 40 | 9 | 40 | 24.5 | 24.5 | 40 | 24.5 | 9 | 9 |
| LLDPE—MA | 20 | 4 | 4 | 20 | 10.0 | 12 | 4 | 12 | 20 |
| Properties: | | | | | | | | | |
| TS (MPa) | 10.7 | 23.1 | 11.8 | 18.8 | 19.2 | 9.3 | 18.4 | 23.4 | 21.9 |
| Mod 100 (MPa) | 5.9 | 8.6 | 6.0 | 6.9 | 7.9 | 6.2 | 7 | 8.5 | 8.3 |
| EB (%) | 704 | 842 | 708 | 838 | 814 | 662 | 805 | 839 | 827 |

These examples show the range of concentrations where a polar copolymer can be used in combination with a polyolefin to provide flexible polymer blends.

EXAMPLES 16 and 17

Polymer blends were prepared by melt compounding various amounts of the polymers of Example 1. Melt compounding was carried out in a 25 mm. corotating double screw extruder at a rate of 7 kg/hr and at a temperature of 200°. Then the resulting pelletized material was reextruded on a 30 mm single screw extruder (L/D=25/1), equipped with a 3:1 compression ratio continuous compression screw at a temperature of 200° through a cast film die tool. Physical testing (DIN 53504,S2; DIN 53 507) was carried out on the extruded film (1 mm). Results are shown in Table 5.

TABLE 5

| | Example No. | | |
|---|---|---|---|
| | 16 | 17 | Comparison |
| LLDPE | 54.75 | 89.5 | 100 |
| EnBACO | 34.15 | 8.0 | — |
| LLDPE—MA | 10.00 | 2.0 | — |
| Antioxidant | 0.50 | 0.5 | — |

TABLE 5-continued

| | Example No. | | |
|---|---|---|---|
| | 16 | 17 | Comparison |
| Properties: | | | |
| TS (MPa) | 8.3 | 21.8 | 27.0 |
| Mod 100 (MPa) | 6.5 | 7.8 | 9.3 |
| EB (%) | 520 | 855 | 845 |
| Tear (kN/m) | 58 | 94 | — |
| Volume Change after 7 days in ASTM Oil | 23 | — | 43.3 |
| No. 1/100° C. (%) | 1.7 | — | 2.1 |
| in ASTM Oil No.3/RT (%) | | | |

These examples show that compatibilized blends of polar and non-polar polyolefins provide flexible films. Also an increase in oil resistance is seen.

What is claimed is:

1. A flexible, non-halogen-containing polymer composition which comprises a blend of:
   (a) 35–96% by weight of a non-polar thermoplastic polyolefin;
   (b) 2–50% by weight of a polar ethylene copolymer which comprises
      (i) 30–80% by weight of ethylene;
      (ii) 5–60% by weight of at least one copolymerizable, ethylenically unsaturated organic compound; and
      (iii) 3–30% by weight of carbon monoxide; and
   (c) 1–30% by weight of a compatibilizing agent which is a carboxylic acid or derivative thereof grafted olefin polymer.

2. A flexible polymer composition of claim 1 wherein the non-polar thermoplastic polyolefin is polypropylene, high density polyethylene, or a linear low density polyethylene.

3. A flexible polymer composition of claim 2 wherein the polar ethylene copolymer consists essentially of:
   (i) 56–76% by weight of ethylene;
   (ii) 10–34% by weight of vinyl acetate or an alkyl acrylate or alkyl methacrylate, wherein the alkyl group is from 1–8 carbon atoms; and
   (iii) 3–15 by weight of carbon monoxide.

4. A flexible polymer composition according to claim 1 wherein the compatibilizing agent is an acid grafted polypropylene or acid grafted polyethylene having an acid content of 0.05–3% by weight of the polymer.

5. A flexible polymer composition according to claim 4 wherein acid grafted olefin polymer is (a) a maleic acid or anhydride grafted polypropylene having a melt flow index measured at 2.16 kg and 190° C. in the range of 50–150 g/10 min., or (b) a maleic acid or anhydride grafted polyethylene or a linear low density polyethylene having a melt flow index measured at 2.16 kg and 190° C. or less than 6 g/10 min.

6. A flexible polymer composition according to claim 1, wherein the blend comprises:
   (a) 40–50% be weight of non-polar thermoplastic polyolefin;
   (b) 20–50% by weight of polar ethylene copolymer; and
   (c) 10–15% by weight of acid grafted olefin polymer.

7. A flexible polymer composition according to claim 1, wherein the blend comprises:
   (a) 50–80% by weight of non-polar thermoplastic polyolefin;
   (b) 10–40% by weight of polar ethylene copolymer; and
   (c) 1–15% by weight of acid grafted olefin polymer.

8. A flexible polymer composition according to any of claims 1, 6, or 7 wherein additives are contained in the composition up to 50% by weight of the total composition.

9. A flexible polymer composition according to claim 1 wherein a filler is added at a concentration of 5 to 30% by weight of the filled composition.

10. A flexible composition according to any of claims 1, 6, or 7 in the form of a shaped article.

11. A flexible composition according to claim 10 wherein the shaped article is a sheet or film.

12. A flexible composition according to claim 1 in the form of a shaped article wherein additives are contained in the composition up to 50% by weight of the total composition.

* * * * *